June 23, 1964  R. GERBER ETAL  3,138,232
CLUTCH MECHANISM

Filed May 26, 1958  4 Sheets-Sheet 1

INVENTORS
ROGER GERBER
BERNARD SANDWELL
BY
*Mitchell Hubert*
ATTORNEYS

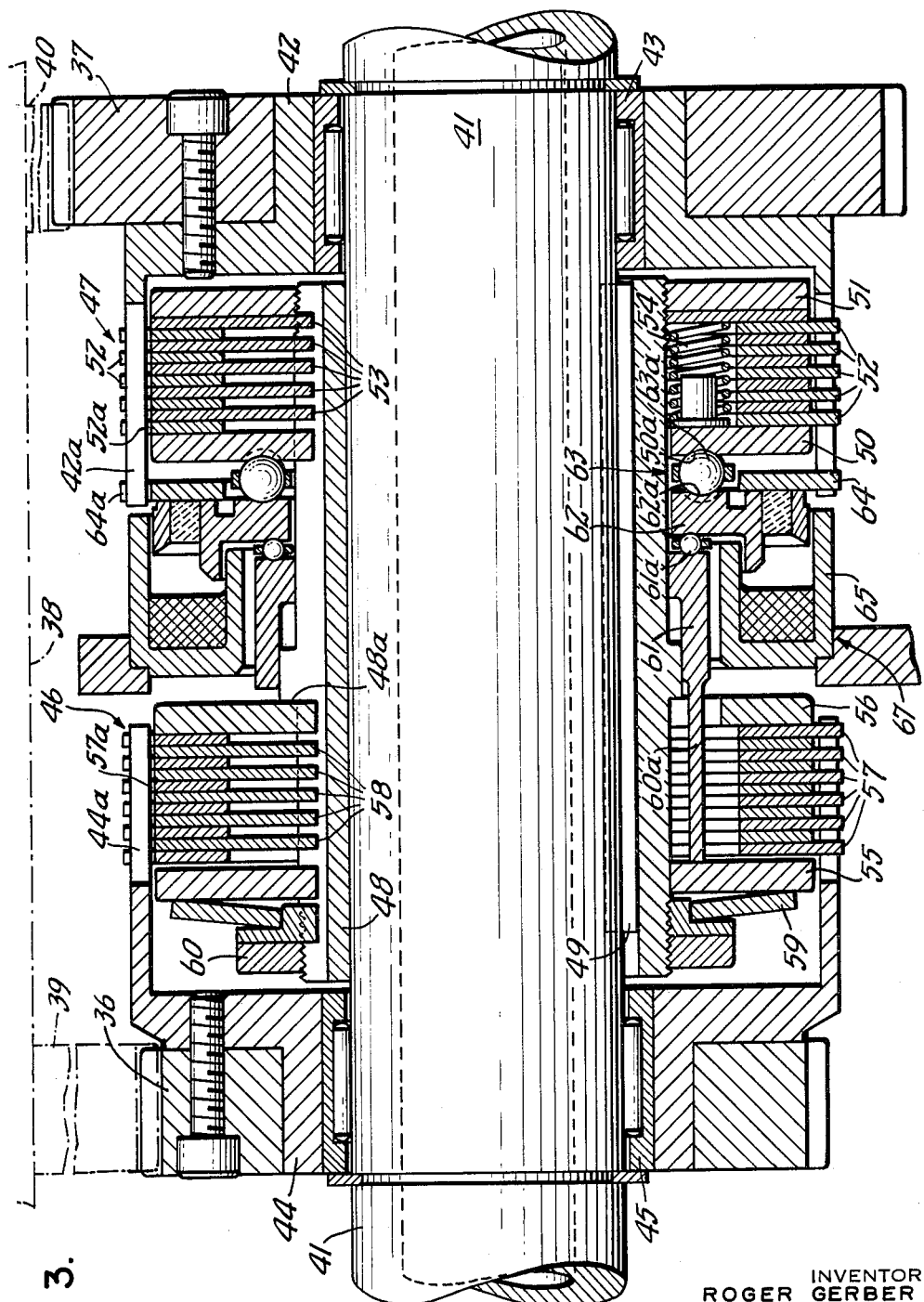

June 23, 1964   R. GERBER ETAL   3,138,232
CLUTCH MECHANISM
Filed May 26, 1958   4 Sheets-Sheet 3

INVENTORS
ROGER GERBER
BERNARD SANDWELL
BY
Mitchell & Bechert
ATTORNEYS

INVENTORS
ROGER GERBER
BERNARD SANDWELL
BY
ATTORNEYS

United States Patent Office 3,138,232
Patented June 23, 1964

3,138,232
CLUTCH MECHANISM
Roger Gerber, Kensington, and Bernard Sandwell, Manchester, Conn., assignors to The New Britain Machine Company, New Britain, Conn., a corporation of Connecticut
Filed May 26, 1958, Ser. No. 737,720
17 Claims. (Cl. 192—48)

My invention relates to multiple clutch mechanisms for use in selective power transmissions or the like.

In multiple clutch mechanisms to be integrated, for example, in selective power transmissions, it is required that the several clutching and declutching phases be closely coordinated to achieve the desired control actions. The transmissions for certain machine tools, for example, are required to provide at least two driving characteristics, usually two different operating speeds, which can be selected repeatedly at a high change-over rate. Heretofore, it has been difficult to attain accurately coordinated clutch action for the several speed selections. Moreover, many previous systems require a number of heavy springs, usually equal to the number of clutch couplings desired, in which case the springs at times fall into opposition so that one spring must be sufficiently strong both to overcome its opposer and to establish the clutching action. Also, in those cases in which the selection of couplings has been made through the agency of an electromagnetic actuator, it is usually necessary to provide an actuator capable of withstanding, for long intervals, energizing voltages which are equivalent to the peak voltages required over the cycle of operation.

Accordingly, it is one object of the present invention to provide an improved multiple clutch mechanism.

Another object of the invention is to provide a multiple clutch mechanism wherein the clutching forces are balanced for the several coupling conditions.

Another object of the invention is to provide an improved multiple clutch, selective transmission affording multiple outputs which can be selectively engaged at a high rate of speed, and in which a common spring member affords the coupling pressures for each clutch stage.

Another object of the invention is to provide an electromagnetically actuated multiple clutch assembly as part of a selective transmission wherein the mechanical portion of the system is isolated from the electromagnetic portion.

Still another object of the invention is to provide multiple clutch mechanism under the control of an electromagnetic actuator working against a common or unitary spring system from which all of the clutching forces derive and which is arranged to afford spring forces which react against the electromagnetic system in direct proportion to the non-linear forces thereof.

Briefly, in one illustrative multiple clutch arrangement formed in accordance with the present invention, a plurality of rotary members, which can be continuously driven from a common source, are supported on a shaft for rotation relatively thereto. A plurality of clutching assemblies are provided to selectively engage and disengage the rotary members to couple them to the shaft. One clutching assembly is normally urged or biased into clutching action by a spring, preferably taking the form of a Belleville spring. The several clutch assemblies include complementary parts axially movable with respect to the shaft to establish the clutching action and the parts are differentially displaced axially of the shaft by a control mechanism representing the selector of the multiple clutch system.

The control mechanism is provided with axially movable members to react respectively against clutch elements of the clutch assemblies. The members are so coupled to the clutch assemblies that the normally engaged clutch assembly can be relieved of the force of the spring which is then conveyed to the second clutch assembly through a chain of mechanical parts, including a part of the disengaged clutch assembly and the two axially movable members of the control mechanism.

The control mechanism can, in accordance with the invention, be actuated mechanically or electromagnetically, as by a solenoid unit which is selectively energizable to impart differential movement to the axially movable members. In such arrangement, the electromagnetic forces exerted by the solenoid characteristically rise as the armature is pulled home. There results a situation in which minimum forces are exerted when the solenoid is first energized and maximum forces exerted at the completion of the travel of the armature. This characteristic can be utilized, for example, to achieve a relatively high clutching force for one clutch assembly. To this end a plurality of Belleville springs of different rating, including curvature, are stacked in series and are stressed to operate initially on the sloping portions of their deflection-force curves. The springs oppose the solenoid action so that one spring is in operation to oppose the initial armature movement, and two springs combine after a predetermined deflection obtains to increase the resistance to armature motion in direct proportion to the forces generated by the solenoid. Alternatively, a single Belleville spring can be operated in the flat portion of its deflection-force curve and the voltage impressed across the solenoid can be lowered after the armature attains position, thereby saving energy and increasing the solenoid life.

The above and other features and objects of the present invention will be better understood by those skilled in the art, having reference to the accompanying drawings illustrating several preferred embodiments of the invention in which:

FIG. 3 is a view in transverse section through its central axis of a selective transmission which is electromagnetically controlled;

Figure 1:
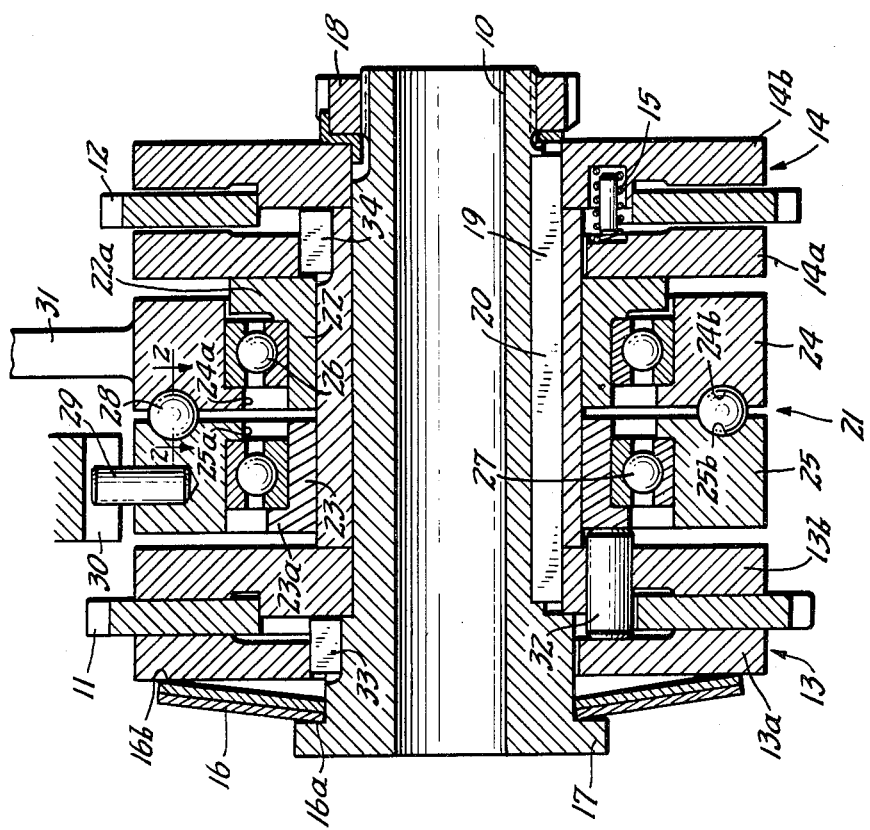
FIG. 1 is a view in transverse section, through its central axis and partly diagrammatic in nature, of a selective transmission utilizing multiple clutches.

Referring to FIG. 1, the invention is illustrated as embodied in a selective transmission system affording a plurality, in this case two, driving conditions between a central rotary shaft 10 and a pair of rotary members 11 and 12, in the form of ring gears, supported concentrically thereon for rotary movement relative thereto. The rotary members 11 and 12 are adapted to be selectively coupled to the rotary shaft 10 through clutch assemblies indicated generally by the numerals 13 and 14. As illustrated, the clutch assembly 13 is in clutching engagement with the rotary member 11. The rotary member 12 is declutched or free of its clutch assembly 14. Thus, the member 11 is coupled with the rotary shaft 10 to turn therewith, and the member 12 is free to rotate relatively thereto. In a typical application of the arrangement of FIG. 1, the members 11 and 12 are gears of different diameter driven from a common drive shaft (not shown) carrying gears of appropriate size. The shaft 10 will, therefore, be driven at different speeds, depending upon which of the clutch assemblies is engaged.

The clutch assembly 13 includes a pair of clutch elements 13a and 13b, the opposed friction surfaces of which are adapted to releasably engage the opposite faces of the rotary member 11, establishing driving relation therewith. The clutch assembly 14 includes a pair of clutch elements 14a and 14b, the opposed friction surfaces of which are adapted to engage releasably the opposite faces of the rotary member 12. The clutch elements 14a and 14b are normally urged apart or out of engagement with the rotary member 12 by light compression springs, including the spring 15, reacting therebetween and disposed inside, radially speaking, of the ring gear or rotary member 12. The clutch elements 13b and 14b and the sleeve 20 are fixed to shaft 10 by a nut 18 and a key 19. The clutch element 13a is keyed to the shaft 10 by a key 33, affording limited axial movement and the element 14a is similarly keyed to the sleeve 20 by a key 34.

The clutch assembly 13 is normally spring biased into clutching engagement with the drive member 11 by means of a spring, preferably taking the form of Belleville spring 16 reacting at its radial inner edge 16a against a shoulder 17 on the shaft 10 and reacting at its radial outer edge 16b against the clutch element 13a, which it is free to move axially on the shaft 10. The reaction force of the Belleville spring 16 is transmitted, when the transmission parts are in the positions shown in the drawing, against a second shoulder 18 also secured to the shaft 10. The coupling is effected through the clutch element 14b, the bushing or sleeve 20, the clutch element 13b, the drive member 11 and the clutch element 13a. In this configuration, the full pressure of the Belleville spring reacts through the clutch assembly 13 to couple the drive member 11 to the shaft 10.

Disposed between the clutch assemblies 13 and 14 is a differential actuator indicated generally by numeral 21. The differential actuator 21 includes a pair of shouldered, inner ring members 22 and 23 closely surrounding the sleeve 20 and a pair of shouldered, outer ring members 24 and 25. The ring members 22 and 24 are concentrically arranged, with the outer member 24 being supported for relative rotation with respect to the inner member 22 by a ball bearing assembly 26. Similarly, the outer member 25, concentrically arranged with respect to the inner member 23, finds its support through a ball bearing assembly 27. In this fashion, the two outer members 24 and 25 can be restrained against rotary movement while the inner members 22 and 23 rotate with the shaft 10. The shoulders 23a and 25a on the companion members 23 and 25 are disposed on opposite sides of the ball bearing assembly 27, axially of the shaft 10, so that axial thrust can be transmitted therebetween through the ball bearing assembly. Similarly, the shoulders 22a and 24a on the companion members 22 and 24 are disposed on opposite sides of the ball bearing assembly 26, thereby facilitating the transmission of axial thrust thereacross.

Formed in the opposing surfaces of the outer members 24 and 25 are cam tracks 24b and 25b, which constitute ball bearing receiving grooves which vary in depth proceeding circumferentially around the members and a number of bearing balls 28 are received in the cam tracks. The segmental cam tracks, as sets, repeat themselves a number of times, say three, over the complete circle, in which case the number of bearing balls is also three, or one for each segmental set of tracks.

Figure 2:
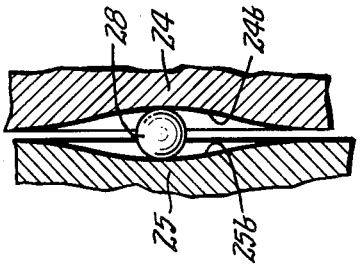
FIG. 2 is a fragmentary sectional view taken substantially on the line 2—2 of FIG. 1, looking in the direction of the arrows.

Referring to FIG. 2, a fragment of the set of cam tracks 24b and 25b is illustrated. The fragment illustrated includes the portion of maximum depth, the depth becoming more shallow moving circumferentially in either direction therefrom. It will be understood that the cam tracks can be symmetrical or asymmetrical. For example, one side or track can be of uniform depth, and the other and complementary side can vary in depth. Also the track can slope in only one direction away from the maximum depth and they can be continuous, one set of tracks running onto the next. By establishing relative rotation between the members 24 and 25, axial thrust is developed to spread the members, spreading also the inner members 22 and 23 through the axial thrust coupling of the ball bearing assemblies 26 and 27. In one preferred arrangement of the invention, the member 25 is restrained against rotation by a pin or key 29 received in a slot 30 formed in a fixed frame piece, the member 25 thereby being free for limited axial movement with respect to the shaft 10. A suitable actuator 31 is coupled to the sleeve 24 to establish relative angular movement with respect to the fixed member 25, the actuator 31 being adapted to be secured to a fixed frame piece at at least two circumferentially spaced points corresponding respectively to the points of maximum depth of the cam tracks 24b and 25b and the points of minimum depth thereof.

The inner member 23 is coupled for axial thrust to the clutch element 13a by means of a plurality of circumferentially spaced thrust numbers 32, one of which is shown in FIG. 1. The axial positions of the clutch elements 13b and 14b are fixed by the sleeve 20.

In operation, when the actuator 31 is moved circumferentially, the members 24 and 25 are driven differentially apart in directions axially of the shaft 10. These relative axial motions are transmitted first to the clutch element 14a, which shifts to the right against the force of the spring 15 to drive the friction surfaces of the clutch elements 14a and 14b into clutching engagement with the drive member 12. This establishes a reaction pressure to the left, as viewed in FIG. 1, by the abutment shoulder 18 and the right hand clutch element 14b. At the same time, the member 25a transmits its thrust to the inner member 23, which urges the thrust numbers 32 endwise to the left against the inner face of the clutch element 13a, thereby compressing the Belleville spring 16 and at the same time separating the friction surfaces of the clutch elements 13a and 13b from the drive member 11. In this fashion, the loading force generated by the Belleville spring 16, while initially operating to hold the clutch assembly 13 in engagement, now operates to hold the clutching assembly 14 in engagement so that a selective drive between shaft 10 and the respective driving members 11 and 12 is attainable, based on a common spring load.

Figure 5:
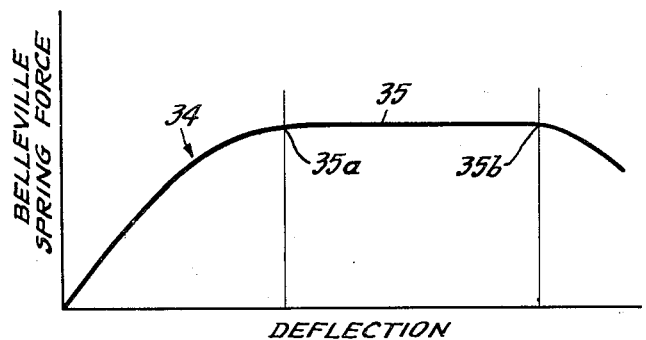
FIG. 5 is a graph plotting the force-deflection characteristics of spring elements useful in the practice of the present invention.

Referring to FIG. 5, there is illustrated a graph, the curve 34 of which plots deflection against force for a Belleville spring. The curve includes a rising portion followed by a generally flat portion 35. In accordance with the present invention, the loading spring 16 can be loaded initially, that is, under the conditions illustrated in FIG. 1, to the deflection point 35a in the flat portion 35 of the curve. The axial deflection point of the spring 16 when the transmission is operated through the actuator 31 to engage the driving member 12 (disengaging the driving member 11), is identified by the point 35b. Thus it will be seen that substantially constant force is exerted by the spring 16 to establish frictional engagement between the respective drive members 11 and 12 and the shaft 10. Other specific arrangements of the Belleville springs will be described below having reference to FIG. 6.

Referring to FIG. 3, there is illustrated a selective power transmission embodying the basic principles of operation of the transmission of FIG. 1, and including, in addition, an electromagnetic actuator for selecting the desired power transmission characteristic of the unit. The transmission of FIG. 3 includes a pair of driven gears 36 and 37, preferably of slightly different diameters and driven, for example, from a common shaft 38 through drive gears 39 and 40 respectively, the latter three elements being illustrated in phantom lines. The output of the transmission system is a shaft or arbor 41 which can take the form, for example, of the spindle drive for a machine tool.

The gear 37 is bolted to a driving cup 42, the gear and cup being supported on the shaft 41 for rotation relatively thereto by means of a roller bearing assembly 43. Similarly, the gear 36 is bolted to a driving cup 44, and the two parts as a unit are supported by the shaft 41 for rotation relatively thereto by means of a roller bearing assembly 45. The gear 37 is, when the parts of the transmission system are arranged in the positions shown in FIG. 3, coupled to turn with the shaft 41 through a first clutch assembly indicated generally by the numeral 47. The gear 36 is free of or decoupled from the shaft 41 by virtue of its clutch assembly, indicated generally by the numeral 46, being disengaged.

The two clutch assemblies 46 and 47 are mounted on a common sleeve 48 secured to the shaft 41 to turn therewith by means of a key and keyway 49. The engaged clutch assembly 47 includes a pair of end thrust washers 50 and 51 between which are laterally compressed a first or driving stack of clutch or friction discs 52 and a second or driven stack of clutch or friction discs 53 interleaved therewith and frictionally coupled thereto, as shown in FIG. 3. The thrust washers 50 and 51 are secured to the sleeve 48 to turn therewith, the washer 50 being keyed to sleeve for freedom in axial movement and the washer 51 being threaded to shift in a fixed axial position. The discs 53 also turn with the sleeve 48, being keyed thereto and free to shift axially. The friction discs 52 are free of the sleeve 48 for all modes of motion, but are coupled to the driving cup 42 to turn therewith through the agency of a series of circumferentially arranged, axial fingers 42a on the driving cup and received in aligned slot or keyways 52a formed in the outer edges of the friction discs 52. It will be understood, therefore, that the axial arms 42a carry and center the friction discs 52 when the latter are freed for radial movement, when the clutch assembly 47 is disengaged by breaking the frictional coupling between the discs 52 and the discs 53. The pressure washers 50 and 51 are urged apart by means of light compression springs 54, one of which is illustrated in FIG. 3 and three of which are provided in all. The compression springs 54 act continuously to urge the washers 50 and 51 apart to disengage the clutch assembly 47, but are far below the strength required to overcome the clutch-engaging mechanism to be described below.

The disengaged clutch assembly 46 includes a pair of end thrust washers 55 and 56, both keyed to the sleeve 48 to turn therewith and slide axially thereon, and between which are disposed a first or driving stack of friction discs 57, and interleaved therewith, a second or driven stack of friction discs 58. The friction discs 58 are keyed to the sleeve 48 to turn therewith and slide axially thereon, and the friction discs 57 are keyed at their peripheries to axially extending arms 44a on the driving cup 44, the discs 57 being formed with axially aligned slots 57a to receive the arms 44a. The end thrust washers 55-56 are, when the clutch is engaged, pressed together to clamp or frictionally couple the stacked friction discs 57 and 58 (thereby coupling the gear 36 to the shaft 41) by means of the spring load of a Belleville spring 59, the outer edge of which reacts axially against the washer 55, and the inner edge of which reacts against an abutment shoulder on a nut 60 secured to a sleeve 48 and working through a wear-piece keyed to the sleeve 48. The washer 56 backs up against an abutment shoulder 48a formed on the sleeve 48 to receive the thrust of the Belleville spring 59.

In the illustrated arrangement, the washer 55 has been shifted axially to the left, overcoming the axial thrust of the Belleville spring 59, and disengaging the clutch assembly 46 by breaking the friction couplings between the discs 57 and 58. The washer 55 is driven to the left away from the companion washer 56 by means of three circumferentially arrayed arms 60a carried by a sleeve 61 which slides axially on the sleeve 48. The axially movable sleeve 61 is coupled through a thrust bearing 61a to an axial thrust member 62 coupled, in turn, to the washer 50 of the clutch assembly 47 through an adjustable thrust bearing assembly 63, which also forms part of the transmission actuating mechanism to be described.

The thrust member 62 is interposed between the axially movable armature 64 and the frame based field and pole piece structure 65 of a solenoid assembly, indicated generally by the numeral 67. The armature 64 of the solenoid 67 takes the form of an annulus slotted in its periphery at 64a to receive, for radial support, the axial fingers 42a of the driving cup 42. The armature therefore turns with the driving cup and, it follows, with the gear 37 attached thereto. The thrust member 62 and the washer 50 include in their axially opposed faces cam tracks or grooves 62a and 50a respectively. These cam tracks, which correspond generally to the cam tracks illustrated in FIG. 2 and associated with the transmission system of FIG. 1, include a series of at least three sets of identical segmental sections or repeats, which, through their coacting balls 63a provide for limited angular displacement of the member 62 relative to the washer 50. In the position illustrated in FIG. 3, the bearing balls 63a of the thrust bearing assembly 63 are disposed at the most shallow points of the cam tracks 62a-50a, thereby causing the thrust member 62 to be spaced axially from the thrust washer 50 by the maximum amount.

In operation, with the solenoid 67 deenergized (in FIG. 3 it has been energized) the gear 37 will normally be turning free of the shaft 41, and the gear 36 will be coupled thereto, the clutch assembly 47 being disengaged and the clutch assembly 46 being engaged. When the solenoid 67 is energized, the armature 64, which is turning with the gear 37, will be pulled to the left toward the solenoid pole pieces 65, thereby establishing frictional engagement between the armature 64 and the thrust member 62, which, being loosely keyed to the shaft 41 through the balls 63a and the washer 50 for limited angular displacement rotates relatively to the shaft and at the speed of the gear 37, this through the coupling of the balls 63a. The frictional coupling between the driven armature 64 and the free thrust member 62 causes the thrust member 62 to turn or rotate about the axis of the shaft 41, thereby driving the pressure washer 50 and the thrust member 62 apart, this, by virtue of the axial inclination of the cam tracks 62a and 50a. The differential action of the separating members 50 and 62 drives the clutch 47 into engagement by compressing friction discs 52 and 53 between the washers 50 and 51 fixed to the sleeve 48. The thrust of the member 62 to the left is transmitted to the thrust bearing 61a, to the sliding sleeve 61, and through the fingers 60a, to the washer 55, which moves to the left against the compression force of the Belleville washer 59, thereby disengaging the clutch assembly 46. It will be understood that the spring load or pressure of the Belleville washer 59 is now transmitted back to the right-hand clutch mechanism 47 through the chain of components described above. Normally, the Belleville spring, the deflection characteristics of which are illustrated in FIG. 5 will be initially stressed so that it is operating on the flat portion of the curve 34, thereby exerting equal forces in both positions. That is to say, the Belleville spring will be exerting a closing force on the clutch assembly 47 which is substantially the same as that exerted when it is in action to close or engage clutch assembly 46. Thus, a single spring element represents a source of clutching force for two clutch assemblies in a single selective transmission.

When the solenoid 67 is deenergized, the thrust member 62 is frictionally decoupled from the armature 64, and immediately seeks a position at which the balls 63a of the ball-bearing assembly 63 ride in the deepest portions of the cam tracks. When riding in the deepest portion of the cam tracks, thrust member 62 and the washer 50 will be brought together to their minimum axial spacing, thus allowing the washer 50 to move to the left to free the friction discs 52 and 53 by virtue of the expanding action of the compression spring 54, tending to separate the washers 50 and 51. Similarly, the axially slidable sleeve 61 will be able to move to the right to release the washer 55 of the clutch assembly 46 to allow the Belleville spring 59 to reestablish frictional or clutching engagement of friction discs 57 and 58 to couple the gear 36 to the shaft 41.

Figure 4:
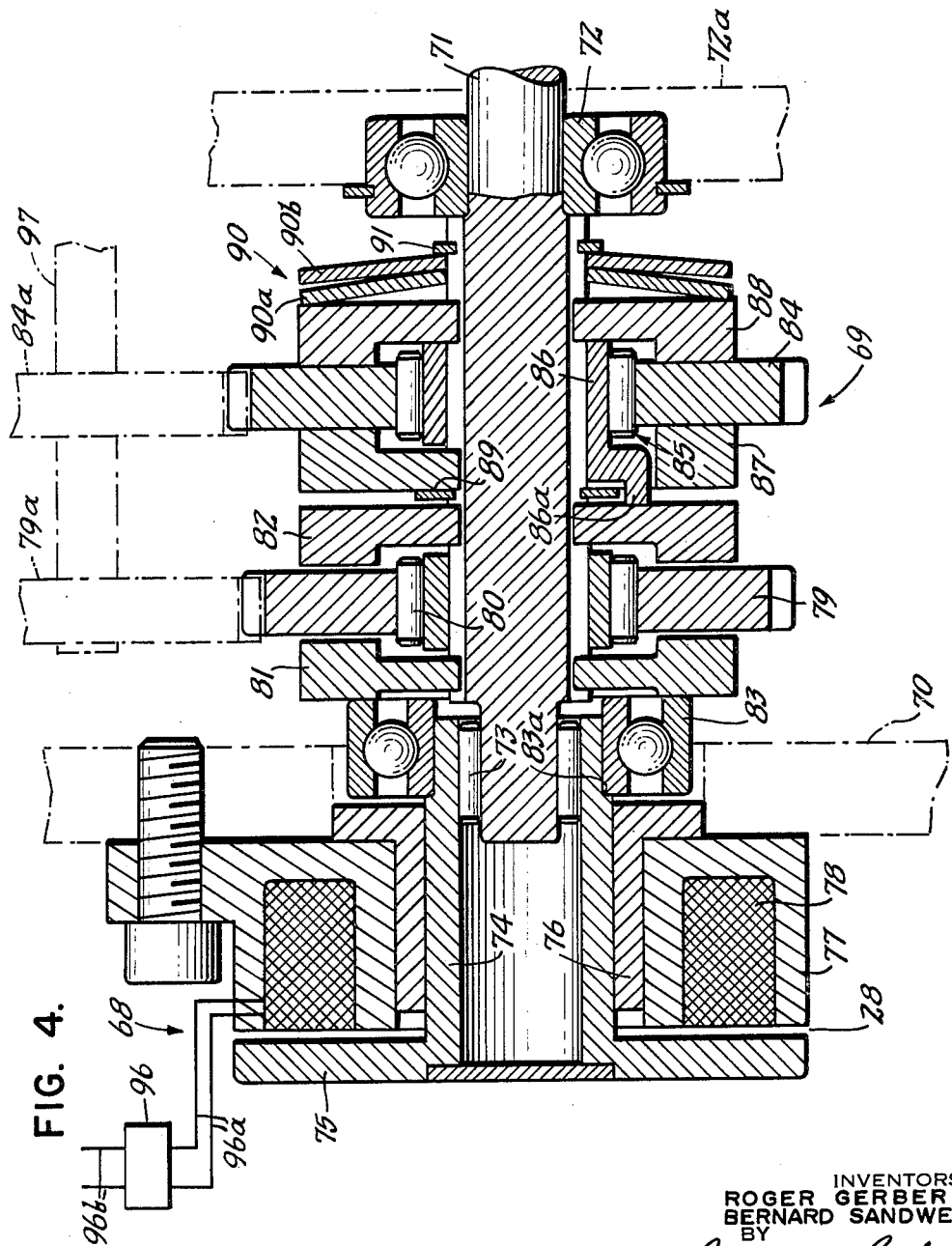
FIG. 4 is a view in transverse section through its central axis of another form of a selective transmission.

Referring to FIG. 4, there is illustrated a modification of the basic invention comprising an electromagnetically actuated, selective transmission system for affording two coupling conditions, i.e. different speed drives, in which the electromagnetic or control section 68 is separated from the mechanical or power transmission section indicated generally by the numeral 69. The two sections 68 and 69 are separated by a wall or frame-piece 70 which can take the form, for example, of a splash lubricated gear box housing of a machine tool. In this fashion, the parts which operate in an oil bath can be fully isolated from the electrical parts. The output of the selective transmission is taken from a shaft 71 supported in a first bearing 72 mounted in a frame part 72a, and in a second bearing 73. The bearing 73 finds its support in a sleeve 74 which is carried by and formed integrally with an armature 75 of the electromagnetic actuator 68. The armature 75, through its sleeve 74, is mounted for axial sliding movement in a bearing bushing 76 carried by the frame part 70. The armature is able, therefore, to move axially. The electromagnetic assembly 68 is completed by a field and pole piece structure 77, including a winding 78. The field structure is secured as by bolts, for example, to the frame part 70, and remains fixed. The power transmission assembly 69 includes a first ring gear 79 carried by the shaft 71 through a roller bearing assembly 80, the gear 79 being free to rotate relatively to the shaft. Mounted on the shaft 71 on opposite sides of the gear 79 are a pair of clutch elements 81 and 82. The clutch elements 81 and 82 are joined to the shaft 71 by axial spline or key means so that they turn with the shaft, but are free to move axially thereon. A thrust bearing 83 carried by the armature 75 forms an abutment against which the clutch element 81 reacts to the left, as viewed in FIG. 4. The axial thrust bearing 83 is received in a recess 83a formed in the armature sleeve 74 so that thrust to the right can be transferred from the armature 75 to the bearing 83 to the clutch element 81.

Also mounted on the shaft 71 is a second driving member in the form of a ring gear 84, with a roller bearing assembly 85 riding on thrust sleeve 86, affording relative movement between the gear 84 and the shaft 71. Embracing the gear 84 are a pair of clutch elements 87 and 88 which, through the agency of a keyway or spline connection, turn with the shaft 71, but are free to move axially thereon. A retainer ring 89 defines the left-hand position of the clutch element 87, the retainer ring being received in a circumferential groove or recess in the shaft 71. A clutch disc 88 is urged to the left, as viewed in the drawing, by spring means 90, which can take the form, for example, of one or more Belleville springs, which are in the nature of dished washers capable of exerting axial thrust when stressed axially between their inner and outer edges. In the illustrated arrangement, a pair of Belleville springs 90a and 90b of slightly different configuration are stressed between the outer face of the clutch element 88 and a retainer ring 91 received in a recess or groove in the shaft 71.

The input members or ring gears 79 and 84 are adapted to be driven from a common input drive shaft 97 through gears 79a and 84a, respectively, the latter three elements being shown in phantom lines. In operation, with the solenoid winding 78 of the electromagnetic actuator 68 deenergized, and the drive shaft 97 in motion, the shaft 71 will be driven through the gear 84a, the ring gear 84, and the activated clutch elements 87 and 88 frictionally coupled to the ring gear and keyed to the shaft 71. The clutching load exerted by the elements 87 and 88 derive from the spring force exerted axially of the shaft 71 by the stressed Belleville spring means 90, which reacts against the retainer ring 89. When the solenoid winding 78 is energized, the armature 75 is pulled to the right towards its pole piece assembly 77, and the axial movement thereof is transferred through the axial thrust bearing 83 to the clutch element 81, which moves to the right to engage the ring gear 79, driving the ring gear against the clutching element 82. The latter is backed up by a series of three axial arms 86a, of which one is shown in the drawing in FIG. 4, causing the sleeve 86 on which the arms 86a are formed, to move to the right to drive the clutch element 88 to the right against the Belleville spring means 90, which deflects to the right to break the frictional coupling between the ring gear 84 and the clutch elements 87 and 88, thereby decoupling the gear 88 from the input shaft 97. At the same time, the axial thrust of the Belleville spring means is now impressed across the ring gear 79 through the clutch elements 81 and 82, so that frictional driving force is established between the drive shaft 97 and output shaft 71. This driving coupling will obtain so long as the solenoid winding 78 remains energized. When the winding 78 is deenergized, the armature 75 is free to move to the left under the force of the Belleville spring 90a working through the clutch element 88, the axially movable sleeve 86, which, through its axial fingers 86a, urges the clutch element 82 to the left against the ring gear 79, which reacts against its second clutch element 81 and through the thrust bearing 83 to the armature 75. The travel to the left of the clutch element 87, however, is intercepted by the retainer ring 89 so that clutching action is established between the ring gear 84 and the clutch elements 87 and 88, whereas the axial forces which would urge clutch elements 81 and 82 against the ring gear 79 has decayed with the decay of the electromagnetic field of the now deenergized solenoid winding 78. The ring gear 79, therefore, will continue to rotate without a driving coupling through the clutch mechanism to the shaft 71.

Figure 6:
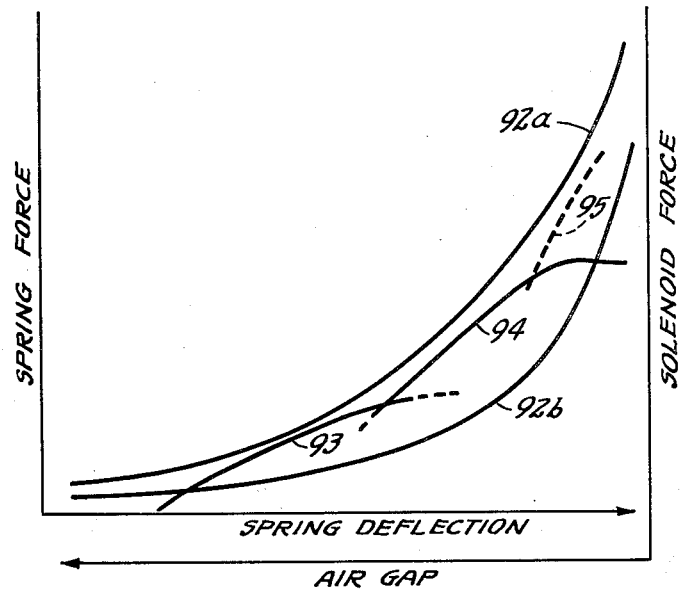
FIG. 6 is a graph plotting solenoid force against air gap distance and showing a family of curves for several energizing voltages.

It will be observed that two Belleville springs 90a and 90b are provided in illustrated arrangement. The function of the multiple Belleville spring in the modification of FIG. 4 will now be described, having reference to FIGS. 5 and 6. It will be recalled, having reference to FIG. 5, that the Belleville springs which load the clutch assemblies of the arrangements of FIGS. 1 and 3 were preferably operated in the flat portion 35 of the curve 34, in which the force exerted by the spring was substantially constant over the range of deflection involved. While this arrangement is suited by many types of operation of the mechanism of the present invention, it is also possible to make use of the Belleville spring in a manner which has particular applicability to an arrangement utilizing an electromagnetic or solenoid actuator and in which relatively high clutching pressures are desired for one of the clutch assemblies. Referring to FIG. 6, there is illustrated a graph in the form of a family of two curves 92a and 92b plotting the force characteristic of the armature of a solenoid against the air gap distance between pole pieces and the armature, the curve identified by the numeral 92a plotting the curve for an energizing in FIG. 5, it is possible to approximate the slope of the voltage of, say, 90 volts, and the curve 92b plotting a similar curve for an energizing voltage for the solenoid of say, 30 volts. By selecting for the Belleville springs 90a and 90b two different deflection characteristics, based on differently dished configurations and different spring forces, and initially stressing the Belleville springs so that only the first spring 90a is deflected and so that it is operating on the sloping portion of the curve 34, as illustrated solenoid curve 92a. The curve 93 represents the characteristics of the spring 90a and approximates the slope of the adjacent portion of the curve 92a.

It will be observed that the curve 93, disposed within the curve 92a, indicates that the electromagnetic armature is able to close the air gap against the spring force.

The rising force characteristic of the armature generally parallels that of the Belleville spring so that spring force increases as the armature force increases. With the armature drawn partially home, or completely home, the force exerted by the armature exceeds the force of the Belleville spring 90a. At this point, therefore, it is possible to lower the energizing voltage on the solenoid winding 78 to, say, 30 volts, giving rise to the force-deflection characteristic curve 92b, which still retains sufficient force to hold against the Belleville spring curve as indicated by the curve 93. To this end, a voltage controller 96 (FIG. 4) can be provided in the energizing conduit 96a for the solenoid winding 78, the controller 96 being energized via a conduit 96b, which can be controlled through any suitable programming device forming no part of the present invention.

In the arrangement of FIG. 4, however, it will be recalled that two Belleville springs 90a and 90b are stacked together in such fashion that for the first increment of deflection, the spring 90a absorbs the load, whereas thereafter, the second spring 90b combines with the spring 90a to exert a combined spring force. This spring force is indicated by the curve 94 in the graph of FIG. 6, the spring 90b also being initially operated in the sloping portion of its characteristic curve 94. The spring 90a, however, is now operating in the flat portion of its curve 93. The combined action of the two Belleville springs 90a and 90b yields a force curve which tends to approximate the adjacent portion of curve of the solenoid. By combining Belleville springs, therefore, it is possible to approximate, depending on the number of Belleville springs used, a force characteristic similar to that of a solenoid, so that spring forces are available for loading the clutch system which are the maximum possible in view of the characteristics of the actuating solenoid. In FIG. 6 the curve 95 of a third Belleville spring is illustrated although this spring is not shown in FIG. 4. By combining a number of Belleville springs, it will be apparent that the axial thrust of the springs increases, so that it is not possible to lower the energizing voltage on the solenoid as far as would be possible were a lesser number of springs to be used.

While the invention has been described above, having reference to preferred embodiments thereof, it will be understood that it can take various forms and arrangements by using various types of actuators for the selective clutching mechanism, and that various types of clutch parts can be used. Also, with respect to the driving characteristics of the transmission, it is not essential that a two-speed selective drive be provided. If desired, for example, one of the clutch assemblies of the transmission can be used to couple a driving motion, and the other can be used to couple a driven shaft to a brake. It is possible, therefore, to provide a fail safe feature by causing the clutch system to automatically engage a brake when say, the power fails. The invention should not, therefore, be regarded as limited except as defined by the following claims.

I claim:

1. A multiple clutch mechanism including a rotary shaft, first and second members mounted on said shaft for rotation and axial displacement relative thereto, first and second clutch means respectively associated with said first and second members and coupled to said shaft to turn therewith, said first and second clutch means having parts movable relative to each other to clutch their respective first and second members to said shaft, spring means common to both said clutch means and normally reacting on said first clutch means to clutch said first member to said shaft, and actuating means common to both said clutch means and including said second member and second clutch means for deflecting said spring means to de-clutch said first member from said shaft and to transfer the reaction of said spring means to said second clutch means to clutch said second member to said shaft.

2. Apparatus as set forth in claim 1, each clutch means including at least a pair of clutch parts realtively movable axially of the shaft, to engage and disengage the corresponding member, said actuating means including compression link means to engage one axially movable part of the first clutch means to urge the latter axially against the spring means for deflection thereof, an axially slidable part mounted to turn with the shaft to engage an axially movable part of the second clutch means, a pair of relatively axially movable clutch actuating parts, and bearing means between one of the actuating parts and the axially slidable part to afford relative rotation therebetween.

3. Apparatus as set forth in claim 1, said actuating means further including at least a pair of relatively axially movable parts, and means to establish relative axial movement between the parts both to engage the second clutch means and to disengage the first clutch means by deflection of said common spring means.

4. Apparatus as set forth in claim 3, said relatively axially movable parts of the actuating means being relatively rotatable, control means to relatively rotate the parts, and means responsive to relative rotation between the parts to effect axial displacement therebetween.

5. Apparatus as set forth in claim 4, said means responsive to relative rotation between the parts comprising axially inclined, circumferential cam track means, and bearing balls in the track means.

6. Apparatus as set forth in claim 3, including an electromagnetic actuator for effecting relative axial movement of said parts.

7. Apparatus as set forth in claim 6, said axially movable parts of the actuating means being relatively rotatable, means responsive to relative rotation therebetween to effect axial displacement therebetween, said electromagnetic means including a non-rotatable field structure, and an armature to rotate with the shaft, said armature and one of said axially movable actuating parts being adapted to frictionally engage upon energization of the electromagnetic means to rotate the part.

8. Apparatus as set forth in claim 7, one of said axially movable parts of the actuating means being one of the parts of a clutch means.

9. Apparatus as set forth in claim 7, including compression link means between one of the axially movable parts of the actuating means and the axially movable part of the first clutch means proximate to the spring means, whereby the clutch part is displaced to deflect the spring means, said compression link means being rotatable with the shaft, and an axial thrust bearing between the compression link means and said one axially movable part of the actuating means.

10. A multiple clutch mechanism including a rotary shaft and first and second members mounted on said shaft for rotation and axial displacement relative thereto, first and second clutch means for said first and second members and coupled to said shaft for rotation therewith, spring means common to both said clutch means and normally reacting on said first clutch means to clutch said first member to said shaft, and actuating means common to both said clutch means and including in part at least one of said members and its coacting clutching means for deflecting said spring means to declutch said first member from said shaft and transfer the total energy of said spring means to said second clutch means to clutch said second member to said shaft.

11. A multiple clutching mechanism for affording, selectively, multiple coupling conditions through a rotary shaft, comprising first and second members mounted on said shaft for rotary and axial movement relative thereto, first and second clutch means respectively associated with the first and second members and coupled to the shaft to turn therewith, each having parts movable relative to each other to clutch the corresponding member to the shaft, spring means common to the two clutch means and normally reacting on the first clutch means to generate clutching forces therein, electromagnetic actuating means common to the two clutch means and coacting with one of said members and its related clutch means to deflect the common spring means and coacting with one of said members and its related clutch means to de-clutch the first clutch means and to carry the reaction force of the deflected spring means to the second clutch means to generate clutching forces therein, said electromagnetic means including a solenoid having an armature which moves upon energization of the solenoid to deflect the spring means, and means to energize the solenoid with a first voltage to initiate operation of the solenoid and with a second, relatively lower voltage after the armature has been displaced.

12. Apparatus as set forth in claim 11, said spring means comprising a Belleville spring of dished washer configuration.

13. A clutching mechanism according to claim 11, in which said electromagnetic means includes a stationary core element of magnetic material having an axially exposed face and in which said armature includes an axially exposed face adjacent said first-mentioned face, there being defined an axial air gap between said faces when said solenoid is de-energized, said armature being rotatably isolated from said spring means, whereby the air gap may be zero when said solenoid is energized.

14. A multiple clutching mechanism for affording, selectively, multiple coupling conditions through a rotary shaft, comprising a barrier wall, bearing means to support the shaft adjacent one end in said barrier wall, first and second members mounted co-axially of the shaft on one side of said barrier wall for rotary movement relative thereto, first and second clutch means respectively associated with the first and second members and coupled to the shaft to turn therewith, each having parts movable relative to each other to clutch the corresponding member to the shaft, spring means common to the two clutch means and normally reacting on the first clutch means to generate clutching forces therein, and electromagnetic actuating means disposed on the other side of the barrier wall and common to the two clutch means to deflect the common spring means to de-clutch the first clutch means and to carry the reaction force of the deflected spring means to the second clutch means to generate clutching forces therein.

15. Apparatus as set forth in claim 14, said electromagnetic actuating means comprising a solenoid having an armature co-axial with said shaft and movable axially relatively thereto, and an axial thrust bearing between the armature and an axially movable part of the second clutch means.

16. A multiple clutch mechanism including a rotary shaft and first and second members mounted on said shaft for rotation and axial displacement relative thereto, first and second clutch means for said first and second members and coupled to said shaft for rotation therewith, spring means common to both said clutch means and normally reacting to engage one said clutch means to couple its coacting member to said shaft, and actuating means common to both said clutch means and including in part one of said members and its coacting clutch means for selectively deflecting said spring means whereby said deflection disengages the one said clutch means and engages the other of said clutch means to couple its coacting member to said shaft.

17. A multiple clutching mechanism for affording, selectively, multiple coupling conditions through a rotary shaft, comprising first and second members mounted co-axially of the shaft for rotary movement relative thereto, first and second clutch means respectively associated with the first and second members and coupled to the shaft to turn therewith, each having parts movable relative to each other to clutch the corresponding member to the shaft, spring means common to the two clutch means and normally reacting on the first clutch means to generate clutching forces therein, electromagnetic actuating means common to the two clutch means to deflect the common spring means to de-clutch the first clutch means and to carry the reaction force of the deflected spring means to the second clutch means to generate clutching forces therein, said electromagnetic means including a solenoid having an armature which moves upon energization of the solenoid to deflect the spring means, said spring means comprising at least two stacked Belleville springs having differently dished configurations, whereby one spring deflects to establish engagement with the other to achieve an ultimate spring force representing a combination of at least two springs, whereby the spring forces increase in direct proportion to the increase in the electromagnetic force of the solenoid as the armature moves.

References Cited in the file of this patent

UNITED STATES PATENTS

| | | |
|---|---|---|
| 1,963,638 | Wilsing | June 19, 1934 |
| 1,996,915 | Fleischel | Apr. 9, 1935 |
| 2,045,557 | Almen et al. | June 23, 1936 |
| 2,209,776 | Kiekhaefer | July 30, 1940 |
| 2,279,986 | Griswold | Apr. 14, 1942 |
| 2,315,298 | Thompson | Mar. 30, 1943 |
| 2,591,989 | Winther | Apr. 8, 1952 |
| 2,639,013 | Meschila | May 19, 1953 |
| 2,658,593 | Doebeli | Nov. 10, 1953 |
| 2,718,951 | Mason | Sept. 27, 1955 |
| 2,775,330 | Schjolin et al. | Dec. 25, 1956 |
| 2,862,589 | Porteous et al. | Dec. 2, 1958 |
| 2,947,394 | Grover | Aug. 2, 1960 |